United States Patent [19]
Whitehead

[11] Patent Number: 5,186,530
[45] Date of Patent: Feb. 16, 1993

[54] LIGHTING STRUCTURE HAVING VARIABLE TRANSMISSIVITY INTERNAL LIGHT GUIDE ILLUMINATION

[75] Inventor: Lorne A. Whitehead, Vancouver, Canada

[73] Assignee: TIR Systems, Ltd., Burnaby, Canada

[21] Appl. No.: 796,305

[22] Filed: Nov. 22, 1991

[51] Int. Cl.⁵ .............................................. F21V 8/00
[52] U.S. Cl. ........................................ 362/31; 362/26
[58] Field of Search ............................. 362/26, 31, 32

[56] References Cited

U.S. PATENT DOCUMENTS

| | | |
|---|---|---|
| 4,105,293 | 8/1978 | Aizenberg et al. |
| 4,260,220 | 4/1981 | Whitehead . |
| 4,615,579 | 10/1986 | Whitehead . |
| 4,750,798 | 6/1988 | Whitehead . |
| 4,787,708 | 11/1988 | Whitehead . |
| 4,805,984 | 2/1989 | Cobb, Jr. . |
| 4,834,495 | 5/1989 | Whitehead et al. . |
| 4,850,665 | 7/1989 | Whitehead . |
| 4,906,070 | 3/1990 | Cobb, Jr. . |
| 4,937,716 | 6/1990 | Whitehead . |
| 5,057,974 | 10/1991 | Mizobe .............................. 362/31 X |
| 5,101,325 | 3/1992 | Davenport et al. ................... 362/31 |

Primary Examiner—Allen M. Ostrager
Attorney, Agent, or Firm—Barriger & Oyen

[57] ABSTRACT

A hollow lighting structure having an optically transmissive light emitting surface. At least one light guide extends within the structure. A light source emits light into the light guide. The light guide's light transmissivity is varied as a function of position on the surface of the light guide such that the angular and spatial distribution of light emitted from the light guide yields a predetermined distribution of light intensity as a function of position on the light emitting surface. The predetermined distribution of light intensity is preferably substantially uniform at all points on the light emitting surface.

38 Claims, 5 Drawing Sheets

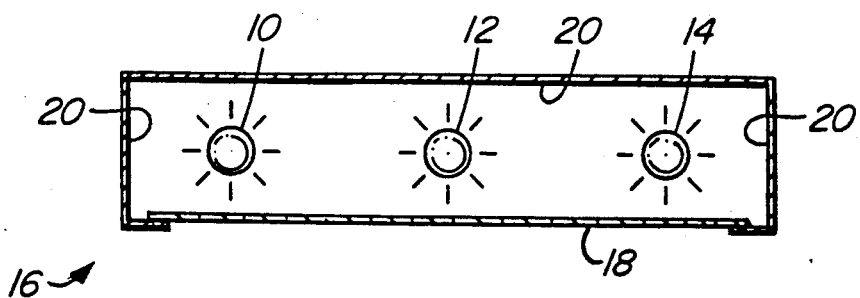
FIG. IA PRIOR ART
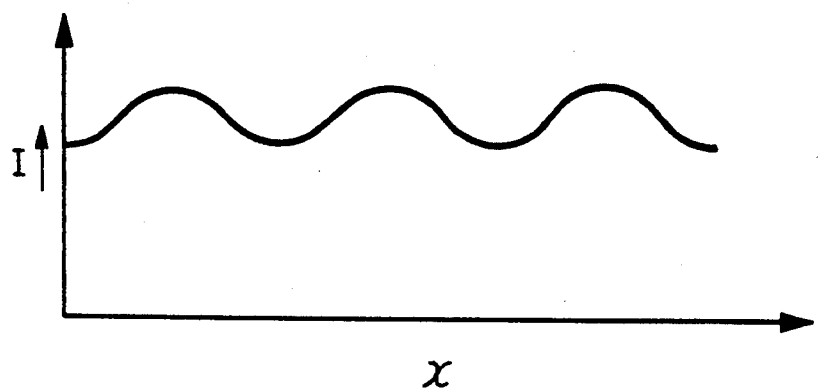
FIG. IB PRIOR ART
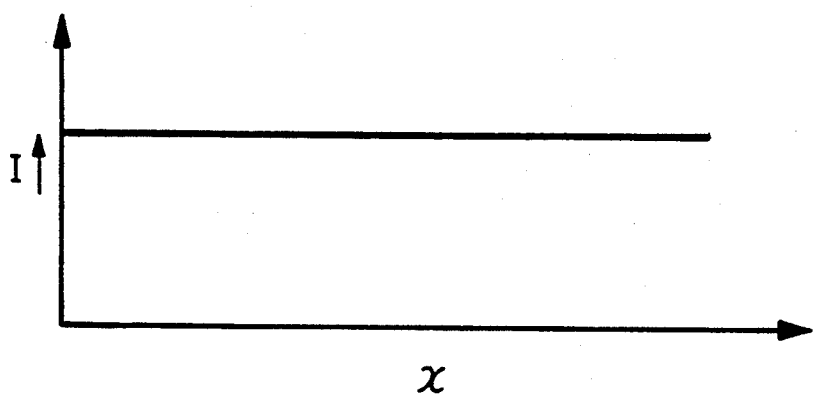
FIG. IC

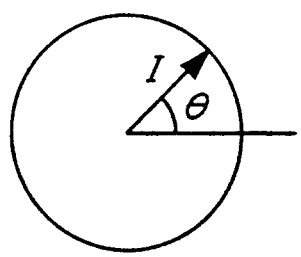
FIG. 2
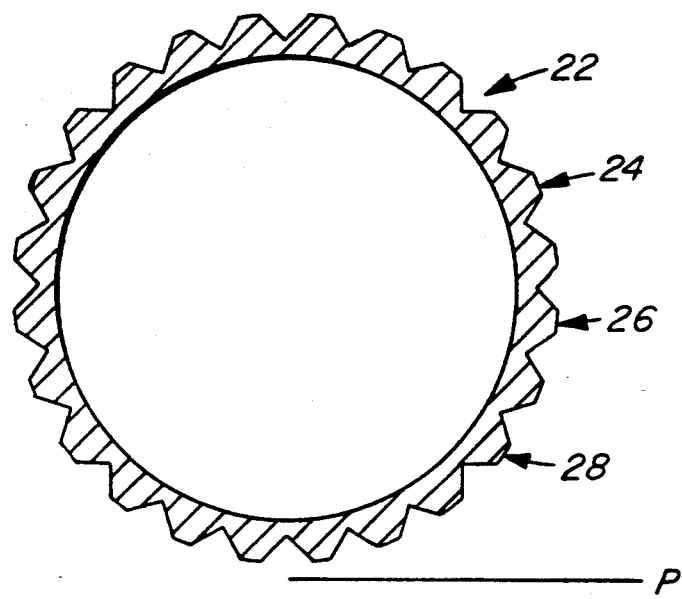
FIG. 3
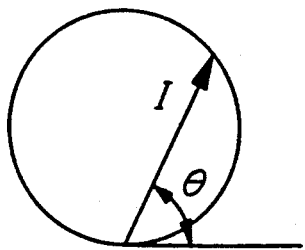
FIG. 4A
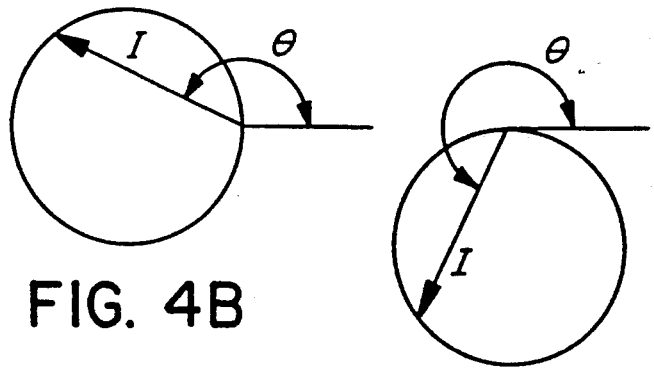
FIG. 4B
FIG. 4C

LIGHTING STRUCTURE HAVING VARIABLE TRANSMISSIVITY INTERNAL LIGHT GUIDE ILLUMINATION

FIELD OF THE INVENTION

This application pertains to an internally illuminated lighting structure such as a light fixture or sign. Light is distributed within the structure by one or more light guides having light transmissivity characteristics which vary both as a function of circumferential angle and as a function of distance down the length of the guide (i.e. as a function of position on the surface of the light guide).

BACKGROUND OF THE INVENTION

There are a wide range of applications for internally illuminated structures such as light fixtures, and signs. Particularly in the case of signs, it is highly desirable for the light emitting portion of the structure to have an accurately controlled distribution of light intensity, which in most cases is preferably a uniform distribution. In the past, there have been two primary approaches to obtaining such a desired intensity distribution. In the first, the desired distribution is achieved by providing a large number of light sources within the structure, and by ensuring that the thickness of the structure is at least as great as the spacing between the light sources, so that the light intensity is not substantially weaker at points on the light emitting portion of the structure which are not adjacent to the light sources.

The second method of controlling the light intensity distribution and achieving uniformity is to provide a variable transmission filter at the external surface of the structure, as disclosed in U.S. Pat. No. 4,937,716 issued Jun. 26, 1990 for an invention of Lorne A. Whitehead entitled "Illuminating Device Having Non-Absorptive Variable Transmissivity Cover". The light transmissivity characteristic of the filter is varied as a function of position to reduce the intensity of the light at places where it might otherwise be too high by reflecting light away from such places; and, to redirect a portion of the reflected light into regions where it is desirable for the light intensity to be increased.

A wide range of light sources can be beneficially employed, generally falling into two categories; namely, direct sources, and emitting light guide sources. In the former case, light passes directly from the light source(s) to the light emitting surface(s) of the structure, whereas in the latter case light is first distributed in at least one dimension by one or more light guides, such as solid dielectric light guides, or prism light guides. In principle, the size and shape of the light sources may be conformed to the size and shape of the internally illuminated structure itself, in which case uniform illumination of the light emitting portion(s) of the structure is not a problem. Also, in principle, it is possible to cover the entire light emitting surface of the structure with a variable transmissivity filter as described above, in which case uniformity is again achievable. However, both of these approaches are necessarily expensive because they require specialized optical materials and necessitate substantially different assembly techniques as compared with those conventionally employed in sign assembly, which is disadvantageous as well.

The present invention facilitates controlled light intensity distribution within a lighting structure in a manner which is compatible with conventional sign assembly techniques.

SUMMARY OF THE INVENTION

In accordance with the preferred embodiment, the invention provides a lighting device consisting of a hollow structure having an optically transmissive light emitting surface. At least one light guide extends within the structure. A light source emits light into the light guide. The light guide's light transmissivity is varied as a function of position on the surface of the light guide (i.e. as a function of the circumferential angle between two planes which intersect a notional axis of the light guide; and, as a function of distance down the length of the guide). The angular and spatial distribution of light emitted from the light guide accordingly yields a predetermined distribution of light intensity as a function of position on the light emitting surface. The predetermined distribution of light intensity is preferably substantially uniform at all points on the light emitting surface.

Advantageously, the light guide may be a sheet of material capable of being flexibly deformed from an initial laid-flat configuration into a curved, assembled configuration. Preferably, the light guide has a substantially curved light emitting surface which subtends an arc exceeding 90°.

A patterned metallic film is preferably provided on the light guide to yield the desired transmissivity variation. The film imparts substantial longitudinal specular reflectivity to the light guide.

The light source may be located outside the structure, for ease of access and replacement. In such case, the light source may emit light into the light guide through a transparent window provided in the structure.

BRIEF DESCRIPTION OF THE DRAWINGS

FIG. 1A is a cross-sectional illustration of a typical prior art illuminated thin sign structure.

FIG. 1B is a graph showing the typical luminous exitance distribution as a function of position for the prior art sign of FIG. 1A.

FIG. 1C is a graph showing the ideal uniform luminous exitance distribution as a function of position which is desirably attained in structures such as the sign of FIG. 1A.

FIG. 2 is a polar graph of luminous intensity versus angle for the light sources employed in the prior art sign of FIG. 1A.

FIG. 3 is a cross-sectional illustration of a circular prism light guide having partially flattened prismatic surfaces.

FIG. 4A is a polar graph of luminous intensity versus angle for light emitting from the top of the circular prism light guide of FIG. 3.

FIG. 4B is a polar graph of luminous intensity versus angle for light emitting from the left side of the circular prism light guide of FIG. 3.

FIG. 4C is a polar graph of luminous intensity versus angle for light emitting from the bottom of the circular prism light guide of FIG. 3.

DETAILED DESCRIPTION OF THE PREFERRED EMBODIMENT

Figure 5A:
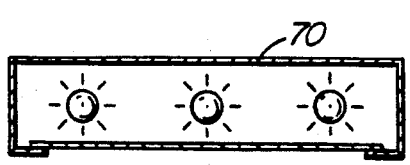
FIGS. 5A and 5B are respectively top and side cross-sectional views of a sign having a configuration like that of the FIG. 1A sign, but employing as light sources light guides having light escape mechanisms which vary as a function of distance down the length of the guide.

FIGS. 1A and 1B illustrate the primary difficulty encountered when a small number of conventional light sources such as light guides 10, 12, 14 are used to illuminate the interior of a hollow prior art lighting structure such as a sign or light fixture. Light guides 10, 12, irradiate the interior surface of the light emitting portion 18 (typically a translucent light diffuser) of structure 16. The remaining interior surfaces 20 of structure 16 are opaque and reflect light. FIG. 1B is a graph showing the typical resultant luminous exitance distribution "I" as a function of position "X" along the light emitting portion 18 of structure 16. As can be seen, an observer in front of light emitting portion 18 perceives substantial variations in the intensity of the emitted light, which is brightest at points closest to light guides 10, 12, 14; dimmest at points farthest away from light guides 10, 12, 14; and of variable, intermediate intensity at points between the aforementioned extremes. In many applications it is preferable to attain a uniform distribution of light intensity over the entire light emitting portion 18 of structure 16, as is ideally depicted in FIG. 1C.

FIG. 2 is a polar graph of the luminous intensity "I", of light guides 10, 12, 14 as a function of the angle $\theta$ between the plane of light emitting portion 18 and the direction of a light ray emitted from any one of light guides 10, 12, 14. As can be seen, the angular luminous intensity distribution of light guides 10, 12, 14 is relatively uniform, which is common for light guides and other light emitters. This uncontrolled, uniform angular distribution of luminous intensity is responsible for the observed variation in the luminous exitance distribution shown in FIG. 1B. Any light guide having a uniform angular luminous intensity distribution will, if employed as a light source within structure 16, yield a variable luminous exitance distribution on emitting surface 18 comparable to that shown in FIG. 1B.

The present invention utilizes certain fundamental characteristics of light guides to efficiently vary the distribution of luminous intensity both as a function of angle and as a function of distance down the length of a light guide to achieve a desired (preferably, substantially uniform, as indicated in FIG. 1C) distribution of luminous exitance from the light emitting portion of a hollow lighting structure within which the light guide serves as a light source, as will now be explained.

The reflective internal surfaces of a hollow light guide cause light to propagate along the guide. If such light guides are used as light sources, some technique must be used to allow light to escape from the light guide, with the specific technique depending upon the type of light guide employed. For example, a commonly used light escapement technique used with prism light guides is the placement of a light diffusing material within the light guide. The material is placed to redirect light rays in directions for which the prismatic light guide walls are incapable of reflection, thereby allowing such rays to escape through the light guide walls. Other techniques for controlling the escape of light from prism light guides are disclosed in U.S. Pat. No. 4,615,579 issued Oct. 7, 1986 for an invention of Lorne A. Whitehead entitled "Prism Light Guide Luminaire"; and, in U.S. Pat. No. 4,850,665 issued Jul. 25, 1989 for an invention of Lorne A. Whitehead entitled "Method and Apparatus for Controlled Emission of Light From Prism Light Guide".

Generally, the luminous intensity distribution of the light which escapes from a light guide is complicated and poorly defined, but in almost all cases there is a regularity which makes it possible to control the distribution. Consider, as a specific example, circular prism light guide 22 depicted in FIG. 3, in which the escape of light is effected by partial flattening of the apices of the light guide's prismatic surfaces 24, 26, 28, etc. If all of the apices of light guide 22 were uniformly flattened then the total luminous exitance distribution of light guide 22 would be as shown in FIG. 2. However, if we consider the luminous intensity distribution of a specific portion of light guide 22, the situation is different.

FIGS. 4A, 4B and 4C show luminous intensity distributions for light emitted at points respectively located on the top, left side and bottom surface of light guide 22. In FIGS. 4A, 4B and 4C, "I" represents the luminous intensity vector in a given direction; and, $\theta$ represents the angle between said direction and the plane "P" depicted in FIG. 3. As can be seen, these distributions are not isotropic, nor are they identical, by Virtue of different directions of the normal vector of the surface of the light guide in the three cases. If light guide 22 were used as a light source within lighting structure 16, then each of these points would, in turn, provide a different distribution of illumination on the interior surface of the light emitting portion 18 of lighting structure 16. There would be substantial overlap of these illuminance distributions, but nevertheless, those skilled in the art will understand that, by controlling the amount of light which leaves different portions of the circumference of light guide 22, it is possible to control the light guide's effective total luminous intensity as a function of angle, and thus control the distribution of light rays on the interior surface of the light emitting portion 18 of lighting structure 16.

Figure 11:
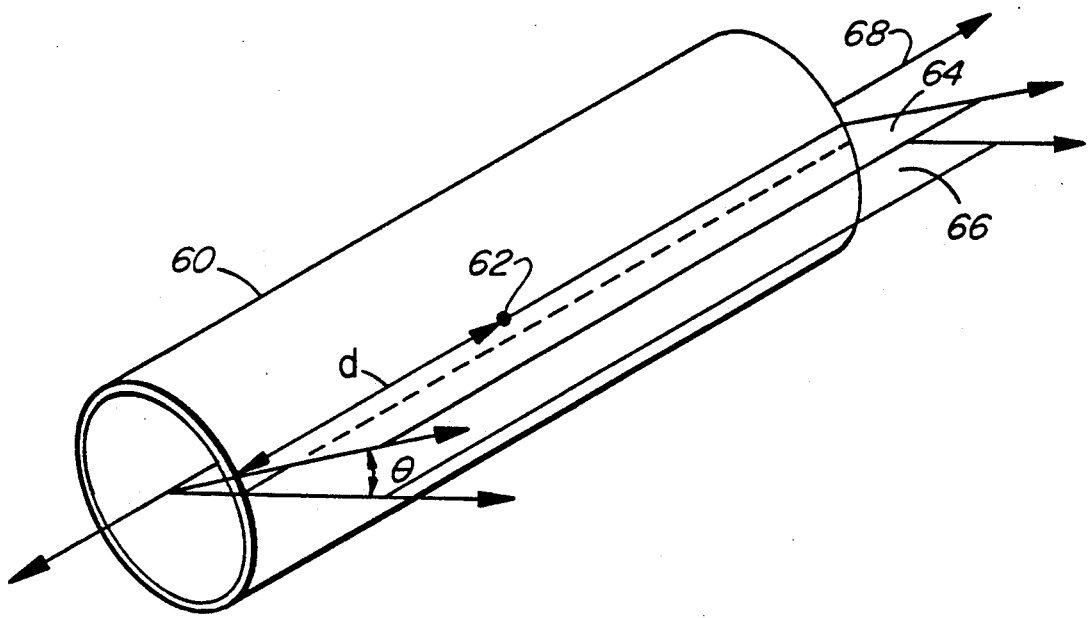
FIG. 11 is a pictorial illustration of a circular light guide, showing how circumferential angle and distance factors uniquely identify selected positions in the light guide.

The present invention employs the foregoing concept by varying the light guide's light escape mechanism as a function of circumferential angle; and, by further varying the circumferential dependence itself as a function of distance down the length of the light guide. FIG. 11 shows how the circumferential angle $\theta$, and distance "d" down a generalized hollow light guide 60, can be used to identify any desired position 62 on the surface of the guide. More particularly, by defining the angle $\theta$ with respect to two planes 64, 66 which intersect the guide's longitudinal axis 68; and by defining the distance "d" down the length of the guide with respect to one end of the guide, an arbitrary point 62 on the surface of the guide can be uniquely identified. A combination of these two functional dependencies can be selected to achieve the desired uniform illumination of the interior surface of the light emitting portion 18 of lighting structure 16.

Figure 5B:
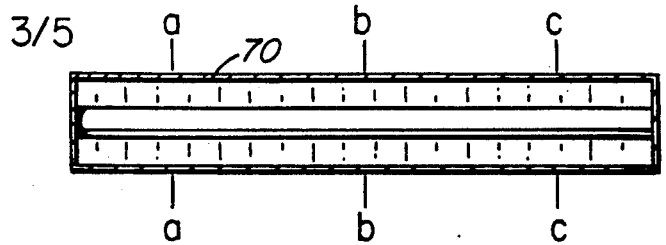
Figure 5C:
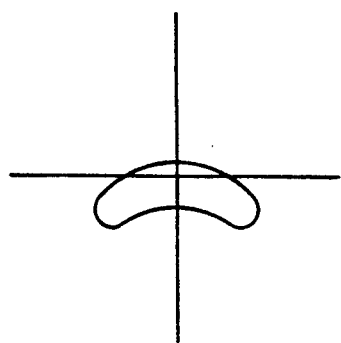
FIGS. 5C, 5D and 5E are graphs of light transmissivity versus circumferential angle for selected positions required to attain uniform illumination of the light emitting portion of the sign of FIGS. 5A and 5B.
Figure 5D:
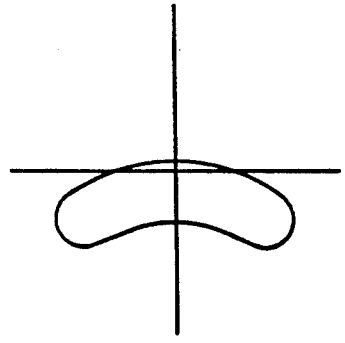
Figure 5E:
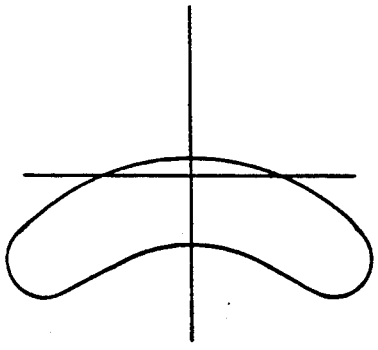

FIGS. 5A and 5B are respectively top and side cross-sectional illustrations of a sign having the same structure as prior art illuminated sign structure 16 of FIG. 1A, but employing as light sources light guides having light escape mechanisms which vary as a function of distance down the length of the guide. FIGS. 5C, 5D and 5E are graphs of light transmissivity versus circumferential angle for the positions "a", "b" and "c" shown in FIG. 5B required to attain uniform illumination of the light emitting portion 70 of the sign. FIGS. 5C, 5D and 5E illustrate the aforementioned dual dependency of light distribution on angle and position (i.e. distance down the length of the guide). Each graph depicts a different light transmissivity as a function of circumferential angle, resulting from suitable variation of the light guide's escape mechanism as a function of circumferential angle. The differences between the graphs show that there is a variation, as a function of distance down the guide, of the aforesaid functional dependence of luminous intensity on circumferential angle.

An advantage of the present invention is that light is efficiently utilized. That is, light which is not transmitted through a given point on the surface of light guide 22 is conserved by being propagated along light guide 22 for transmission therethrough at some other point, rather than being substantially wasted by being confined within the light guide and ultimately absorbed by the light guide's walls. Therefore, the invention provides a practical means for attaining uniformity with a small number of light guides, and also is efficient because it makes maximum use of the available light energy.

Figure 6:
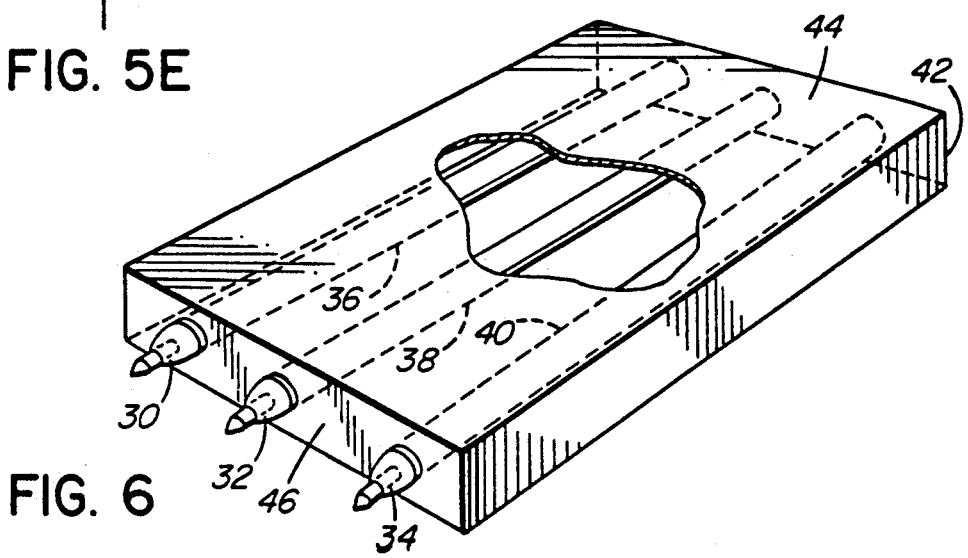
FIG. 6 is a partially fragmented pictorial illustration of an internally illuminated lighting structure constructed in accordance with the preferred embodiment of the invention and employing externally mounted light sources.

A primary benefit of utilizing light guides to distribute light within a hollow lighting structure is to enable illumination of the structure by means of externally mounted lamps. FIG. 6 illustrates the use of external lamps 30, 32, 34 which emit light into light guides 36, 38, 40 respectively. Light guides 36, 38, 40 extend within hollow lighting structure 42 and are configured, in accordance with the invention, to allow light to escape and uniformly illuminate the interior surface of the light emitting portion 44 of structure 42. Advantageously, lamps 30, 32, 34 emit light into the light guides through transparent windows in wall 46 of structure 42, thus allowing structure 42 to be sealed against penetration of dust and other foreign matter, while leaving the lamps readily accessible for repair or replacement.

Figure 7:
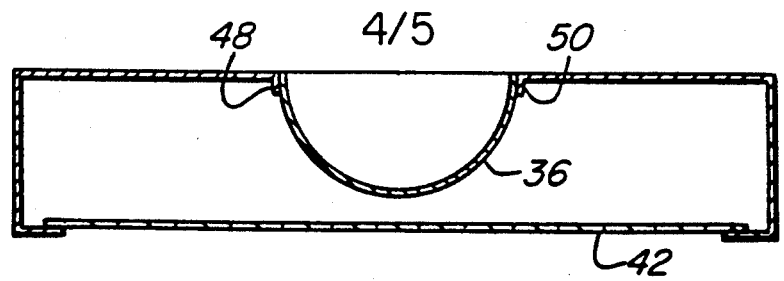
FIG. 7 is a cross-sectional illustration of an internally illuminated lighting structure constructed in accordance with the preferred embodiment of the invention and employing a light guide made of sheet material capable of being flexibly deformed from an initial laid-flat configuration into a curved, assembled configuration.

As shown in FIG. 7, light guide 36 may be made from a flat sheet of flexible material which can be elastically deformed into a predetermined shape defined by retaining clips 48, 50 provided in lighting structure 42. The sheet material has an initial laid-flat configuration suitable for shipping, but may be quickly and easily deformed into its desired curved, assembled light guide configuration. One of the benefits of this approach is that thin, flexible materials can be economically shipped from an optical materials manufacturing site to a sign manufacturing site. The material can also be sufficiently inexpensive that it is practical for the ultimately created light guide to have a reasonably low aspect ratio (i.e. the ratio of the light guide's length to its average diameter may typically be only 10). This lower aspect ratio is advantageous since it reduces the required optical efficiency, and hence the cost, of the reflection material employed in the light guide.

Figure 8:
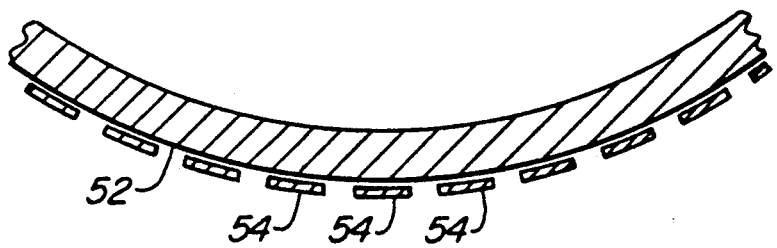
FIG. 8 is a greatly enlarged cross-sectional illustration of a portion of a sheet of deformable light guide forming material adapted to control the escape of light through the material.

FIG. 8 is a greatly enlarged cross-sectional illustration of a section of flexible sheet material which is less efficient as a light guide than high quality prism light guide material, but which more readily facilitates control of light escapement as a function of position. The material consists of a transparent substrate 52 onto which a thin aluminum film 54 is vapour deposited. Portions of the film are removed in a selected fine pattern which varies as a function of position on the material, thereby varying the material's average light transmissivity as a function of position. When the material is deformed as aforesaid to form a light guide, the light guide's transmissivity is similarly varied. It will thus be understood that by removing a suitable pattern of metallic film from the substrate, and then deforming the substrate into the configuration shown in FIG. 7, one may create a light guide having light transmitting characteristics which vary both as a function of circumferential angle and as a function of distance down the length of the light guide, thereby facilitating uniform illumination of the light emitting portion of a lighting structure such as structure 42.

There are a number of well known techniques for producing patterns in metallic films, notably in the packaging industry, and in the printed circuit board industry. One of the primary benefits of this method of controlling the escape of light through a transparent substrate as a function of position is that the fractional escape rate at any given point is determined entirely by the area fraction of metal removed from the substrate, which can be very precisely controlled. This is very helpful, because careful control of the distribution of escaping light as a function of position is critical to the present invention.

A number of factors are relevant to the choice of the cross sectional shape of the light guides employed in the invention, some of which have already been mentioned with regard to practical fabrication issues. From an optical point of view, there are two primary considerations. First, it is generally preferable that the light guide's light emitting surface be substantially curved, and that the arc of this curve be substantial (i.e., typically greater than 90°). This facilitates control of the light guide's luminous intensity distribution as a function of azimuthal angle to help achieve the desired distribution of intensity on the light emitting surface of the lighting structure. Second, as with all light guides, it is generally desirable to keep the light guide's effective aspect ratio as low as reasonably possible. In practice, this tends to suggest cross sectional shapes for the light guide which are roughly circular. However, there is a potential problem with circular, elliptical, or confocal designs, as described below. Therefore, it will also generally be desirable to select shapes which are reasonably open, not deviating too much from circular, but which are less regular, as is the case for the deformed sheet of FIG. 7.

Figure 9:
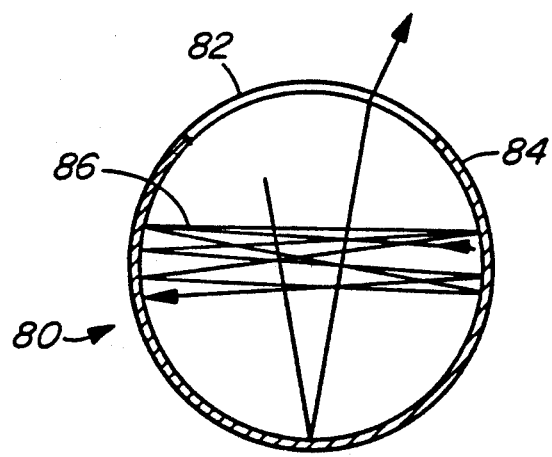
FIG. 9 is a cross-sectional illustration of a circular light guide, showing how inefficiencies may occur if light rays are confined within the guide in regions where little or no light is allowed to escape.
Figure 10:
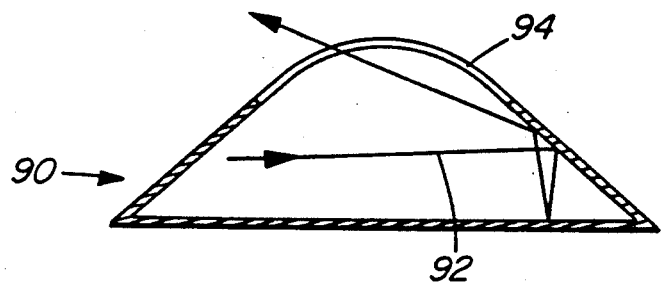
FIG. 10 is a cross-sectional illustration of a non-circular light guide which avoids the inefficiencies inherent in the circular light guide of FIG. 9.

The problem with circular light guides is illustrated in FIG. 9 which depicts a circular light guide 80 having a light emitting position 82. In most cases there will be regions in the circular cross section, such as region 84, where it is desirable to have little light escape. This results in inefficiency, because light rays 86 reflected from such portions are propagated along the light guide in these regions, and therefore never have an opportunity to be efficiently utilized elsewhere. This problem is shared by a number of light guide cross sectional shapes, including elliptical shapes. FIG. 10 shows how this problem is avoided by the less regular shape employed in the preferred embodiment of the invention. In particular, uniquely-shaped light guide 90 reflects light rays 92 in such a manner that there is a high probability for rapid escapement of such rays through light emitting portion 94, as compared with the less rapid escape (or nonescape) of rays from circular light guide 80.

In addition to the design considerations described above, a primary design problem is the selection of the pattern of transmissivity as a function of both circumferential angle and distance down the light guide. While it is true that in a given configuration there is a 1:1 correspondence between a given functional dependency and the resultant distribution of light intensity on the surface; the mathematical "inversion" of this problem, which is to calculate the optimal transmission function for a given distribution, is exceedingly complex. However, two main features of the correct functional dependency will generally be true: the transmission should be higher for surface locations which face in directions where light levels would otherwise be relatively low, and should also be higher farther from the source, because light levels in the guide itself will have diminished by that point. With these two general design criteria in mind, it is possible to select a number of trial distributions to find one which is reasonably close to the desired one. From that point on, it is possible to use iterative techniques to develop the ideal pattern. Iterative techniques are essential because every change to the transmissivity function alters the distribution of light intensity an direction within the guide, thus changing the pattern required to obtain the desired uniform output. Despite the apparent complexity of this iterative procedure, it is usually possible within less than 5 iterations to obtain a high degree of uniformity in light output distribution (i.e. within ±20% and in some cases much better).

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:
1. A lighting device, comprising:
 (a) a hollow structure having an optically transmissive light emitting surface;
 (b) at least one light guide extending within said structure; and,
 (c) a light source for emitting light into said light guide;
 wherein the light transmissivity of said light guide is varied as a function of position on the surface of said light guide such that the angular and spatial distribution of light emitted from said light guide results in a predetermined distribution of light intensity as a function of position on said light emitting surface.

2. A lighting device as defined in claim 1, wherein said predetermined distribution of light intensity is substantially uniform at all points on said light emitting surface.

3. A lighting device as defined in claim 2, wherein said light guide further comprises a sheet of material flexibly deformable from an initial laid-flat configuration into a curved, assembled configuration.

4. A lighting device as defined in claim 3, further comprising a patterned metallic film on said light guide for producing said transmissivity variation.

5. A lighting device as defined in claim 4, wherein said film imparts substantial longitudinal specular reflectivity to said light guide.

6. A lighting device as defined in claim 5, wherein said light source is located outside said structure.

7. A lighting device as defined in claim 6, wherein light source emits light into said light guide through a transparent window in said structure.

8. A lighting device as defined in claim 1, wherein said light guide further comprises a sheet of material flexibly deformable from an initial laid-flat configuration into a curved, assembled configuration.

9. A lighting device as defined in claim 8, further, comprising a patterned metallic film on said light guide for producing said transmissivity variation.

10. A lighting device as defined in claim 9, wherein said film imparts substantial longitudinal specular reflectivity to said light guide.

11. A lighting device as defined in claim 10, wherein said light source is located outside said structure.

12. A lighting device as defined in claim 11, wherein light source emits light into said light guide through a transparent window in said structure.

13. A lighting device as defined in claim further comprising a patterned metallic film on said light guide for producing said transmissivity variation.

14. A lighting device as defined in claim 13, wherein said film imparts substantial longitudinal specular reflectivity to said light guide.

15. A lighting device as defined in claim 14, wherein said light source is located outside said structure.

16. A lighting device as defined in claim 15, wherein light source emits light into said light guide through a transparent window in said structure.

17. A lighting device as defined in claim 2, further comprising a patterned metallic film on said light guide for producing said transmissivity variation.

18. A lighting device as defined in claim 17, wherein said film imparts substantial longitudinal specular reflectivity to said light guide.

19. A lighting device as defined in claim 18, wherein said light source is located outside said structure.

20. A lighting device as defined in claim 19, wherein light source emits light into said light guide through a transparent window in said structure.

21. A lighting device as defined in claim 2, wherein said light source is located outside said structure.

22. A lighting device as defined in claim 21, wherein light source emits light into said light guide through a transparent window in said structure.

23. A lighting device as defined in claim 3, wherein said light source is located outside said structure.

24. A lighting device as defined in claim 23, wherein light source emits light into said light guide through a transparent window in said structure.

25. A lighting device as defined in claim 4, wherein said light source is located outside said structure.

26. A lighting device as defined in claim 25, wherein light source emits light into said light guide through a transparent window in said structure.

27. A lighting device as defined in claim 8, wherein said light source is located outside said structure.

28. A lighting device as defined in claim 27, wherein light source emits light into said light guide through a transparent window in said structure.

29. A lighting device as defined in claim 9, wherein said light source is located outside said structure.

30. A lighting device as defined in claim 29, wherein light source emits light into said light guide through a transparent window in said structure.

31. A lighting device as defined in claim 1, wherein said light source is located outside said structure.

32. A lighting device as defined in claim 31, wherein light source emits light into said light guide through a transparent window in said structure.

33. A lighting device as defined in claim 13, wherein said light source is located outside said structure.

34. A lighting device as defined in claim 33, wherein light source emits light into said light guide through a transparent window in said structure.

35. A lighting device as defined in claim 17, wherein said light source is located outside said structure.

36. A lighting device as defined in claim 35, wherein light source emits light into said light guide through a transparent window in said structure.

37. A lighting device as defined in claim 4, wherein said light guide has a substantially curved light emitting surface.

38. A lighting device as defined in claim 37, wherein said curved light emitting surface subtends an arc exceeding 90°.

* * * * *